(12) United States Patent
Lee et al.

(10) Patent No.: US 11,732,770 B2
(45) Date of Patent: Aug. 22, 2023

(54) MASS DAMPER FOR VEHICLE AIR CONDITIONING SYSTEM

(71) Applicants: Hyundai Motor Company, Seoul (KR); Kia Corporation, Seoul (KR)

(72) Inventors: Yong Han Lee, Seoul (KR); Yong Woong Cha, Yongin-Si (KR); Sung Je Park, Seogwipo-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/845,729

(22) Filed: Jun. 21, 2022

(65) Prior Publication Data

US 2022/0412423 A1    Dec. 29, 2022

(30) Foreign Application Priority Data

Jun. 25, 2021 (KR) .................. 10-2021-0082790
Jun. 7, 2022 (KR) .................. 10-2022-0068619

(51) Int. Cl.
*F16F 7/10* (2006.01)
*B60R 13/08* (2006.01)
*B60H 1/00* (2006.01)

(52) U.S. Cl.
CPC ........... *F16F 7/10* (2013.01); *B60H 1/00571* (2013.01); *B60R 13/08* (2013.01); *B60H 2001/006* (2013.01); *F16F 2222/08* (2013.01); *F16F 2224/02* (2013.01); *F16F 2224/0208* (2013.01)

(58) Field of Classification Search
CPC .... F16F 7/10; F16F 7/104; F16F 7/108; F16F 2222/08; F16F 2224/02; F16F 2224/0208; B60H 1/00571; B60H 2001/006; B60R 13/08
See application file for complete search history.

(56) References Cited

U.S. PATENT DOCUMENTS

| | | | | |
|---|---|---|---|---|
| 5,013,166 A * | 5/1991 | Domer | ............... | B60G 21/0551 384/220 |
| 5,056,763 A * | 10/1991 | Hamada | .................. | F16F 15/10 267/141 |
| 5,884,902 A * | 3/1999 | Hamada | .................. | F16F 7/108 267/141 |
| 5,971,859 A * | 10/1999 | Runge | .................... | F16F 15/10 464/83 |
| 6,308,810 B1 * | 10/2001 | Kuwayama | ......... | F16F 15/1435 188/379 |
| 6,450,487 B1 * | 9/2002 | Kuwayama | .......... | F16F 15/1442 267/141 |
| 6,485,370 B1 * | 11/2002 | Kurosu | .................... | F16F 15/10 267/141 |
| 6,499,730 B1 * | 12/2002 | Kuwayama | ............. | F16F 7/108 267/141 |
| 6,550,754 B2 * | 4/2003 | Kuwayama | ............. | F16F 7/108 267/141.5 |

(Continued)

*Primary Examiner* — Thomas W Irvin
(74) *Attorney, Agent, or Firm* — Morgan, Lewis & Bockius LLP (57) ABSTRACT

A mass damper for a refrigerant pipe is configured to insulate vibration and noise of the refrigerant pipe for the flow of a refrigerant circulating in a vehicle air conditioner system and a mass damper for a vehicle air conditioner system is configured to prevent an external circumferential surface of a casing from cracking due to thermal deformation.

20 Claims, 11 Drawing Sheets

(56) References Cited

U.S. PATENT DOCUMENTS

| | | | |
|---|---|---|---|
| 6,682,060 B2 * | 1/2004 | Kato | F16F 15/10 267/141 |
| 6,793,050 B2 * | 9/2004 | Nylander | F16F 15/10 267/141.1 |
| 6,857,623 B2 * | 2/2005 | Kuwayama | F16F 7/108 267/141 |
| 6,981,579 B2 * | 1/2006 | Kuwayama | F16F 15/1442 267/141.1 |
| 7,635,118 B2 * | 12/2009 | Hayashi | F16F 15/1442 267/141.2 |
| 7,946,925 B2 * | 5/2011 | Kawakatsu | F16F 15/1442 188/380 |
| 8,038,540 B2 * | 10/2011 | Hoeks | F16F 15/1442 403/1 |
| 8,136,646 B2 * | 3/2012 | Kuwayama | F16F 7/108 267/141 |
| 8,899,392 B2 * | 12/2014 | Kim | F16L 55/0336 267/141 |
| 9,297,435 B2 * | 3/2016 | Cerri | F16F 7/108 |
| 9,410,597 B2 * | 8/2016 | Manzoor | F16F 15/1442 |
| 9,909,646 B2 * | 3/2018 | Kwon | F16F 15/10 |
| 9,920,813 B2 * | 3/2018 | Kim | F16F 15/1435 |
| 10,107,357 B2 * | 10/2018 | Cho | F16F 15/1407 |
| 10,603,970 B2 * | 3/2020 | Auten | F16F 1/3814 |
| 10,914,355 B2 * | 2/2021 | Aho | F16F 1/3863 |
| 11,105,391 B2 * | 8/2021 | Orioku | F16F 15/126 |
| 11,378,152 B1 * | 7/2022 | Gaspar | F16F 13/14 |
| 11,434,974 B2 * | 9/2022 | Ditzel | F16F 7/104 |
| 2004/0041318 A1 * | 3/2004 | Kuwayama | F16F 15/10 188/379 |
| 2004/0149532 A1 * | 8/2004 | Beigang | F16F 15/1435 188/379 |
| 2008/0023899 A1 * | 1/2008 | Hasegawa | F16F 7/108 267/141.1 |
| 2010/0285892 A1 * | 11/2010 | Hoeks | F16F 15/10 188/379 |
| 2013/0112518 A1 * | 5/2013 | Kim | F16F 7/108 188/379 |
| 2014/0001000 A1 * | 1/2014 | Sinadinos | B60H 1/00857 188/378 |
| 2015/0043157 A1 | 2/2015 | Lai | |
| 2015/0337916 A1 * | 11/2015 | Cerri | F16F 7/108 188/379 |
| 2020/0362938 A1 * | 11/2020 | Kojima | F16F 13/1481 |
| 2021/0025475 A1 * | 1/2021 | Ditzel | F16F 7/108 |
| 2022/0042567 A1 * | 2/2022 | Geisen | F16F 1/38 |

\* cited by examiner

MASS DAMPER FOR VEHICLE AIR CONDITIONING SYSTEM

CROSS-REFERENCE TO RELATED APPLICATION

The present application claims priority to Korean Patent Applications Nos. 10-2021-0082790 filed on Jun. 25, 2021 and 10-2022-0068619 filed on Jun. 7, 2022, the entire contents of which is incorporated herein for all purposes by this reference.

BACKGROUND OF THE PRESENT DISCLOSURE

Field of the Present Disclosure

The present disclosure relates to a mass damper for a vehicle air conditioner system, and more particularly, to a mass damper for a refrigerant pipe configured to insulate vibration and noise of the refrigerant pipe for the flow of a refrigerant circulating in the air conditioner system.

Description of Related Art

In general, an air conditioner system for a vehicle is a system configured to maintain a comfortable indoor environment by controlling the temperature and humidity of a vehicle interior.

The air conditioner system controls the temperature and humidity of the vehicle interior through compression, condensation, expansion, evaporation, etc. of the refrigerant, and the air conditioner system includes a compressor and condenser connected through the refrigerant pipe, an expansion valve, and an evaporator.

In general, an air conditioner system generates vibration due to the airstream of a refrigerant. The compressor causes vibration and noise in a process of compressing the refrigerant, and the vibration of the compressor is also transmitted to the refrigerant pipe.

Conventionally, to reduce the vibration and noise of the refrigerant pipe, a mass damper is provided as a separate component in the refrigerant pipe.

A conventional mass damper includes a mass and a casing formed outside the mass, and the mass and the casing are formed of different materials.

The conventional mass damper has a problem in that the external circumferential surface of the casing cracks due to the difference in expansion rates depending on the materials for the mass and the casing when exposed to a sudden temperature change. Furthermore, the conventional mass damper has problems in that moisture and foreign substances are introduced into the casing through cracks in the casing and in that durability deteriorates.

To improve these problems, conventionally, the casing is covered with a heat-shielding pad to prevent the casing from cracking, or a thermal shock-absorbing hole is formed in the external circumferential surface of the casing and an insoluble coating is formed in a portion of the casing at which the mass is exposed through the thermal shock-absorbing hole to prevent moisture and foreign substances from entering the casing.

However, the insoluble coating and the heat-shielding pad disadvantageously increase the cost of the mass damper.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mass damper for a vehicle air conditioner system configured to prevent the external circumferential surface of a casing from cracking due to thermal deformation caused by the difference in the material and expansion rate between a mass and a casing.

The objects of the present disclosure are not limited to those described above. Other objects of the present disclosure will be clearly understood from the following description, and are able to be implemented by means defined in the claims and combinations thereof.

The mass damper of the vehicle air conditioner system is a vibration isolator mounted on a refrigerant pipe for flow of refrigerant in the vehicle air conditioner system to reduce vibrations generated in the refrigerant pipe, and includes the following configuration.

Various aspects of the present disclosure are directed to providing a mass damper for a vehicle air conditioning system, mounted on a refrigerant pipe for flow of a refrigerant in the vehicle air conditioner system to reduce vibrations generated in the refrigerant pipe, the mass damper including a mass having a predetermined weight, a casing injection-molded outside the mass and mounted to surround the refrigerant pipe at a predetermined position of the refrigerant pipe, and a plurality of fixing jigs insertion hole formed in an internal circumferential surface of the casing facing the refrigerant pipe to expose the mass to the outside of the casing therethrough.

In various exemplary embodiments of the present disclosure, the mass damper may further include a sealing rib provided on the internal circumferential surface of the casing and provided in a shape of a closed loop to surround the plurality of fixing jig insertion holes in the closed loop.

In various exemplary embodiments of the present disclosure, the sealing rib may be in airtight contact with an external circumferential surface of the refrigerant pipe when the casing is mounted on the refrigerant pipe, and the sealing rib may seal the fixing jig insertion holes together with the refrigerant pipe when the casing is mounted on the refrigerant pipe.

Furthermore, the sealing rib may protrude inwards from the internal circumferential surface of the casing.

In another exemplary embodiment of the present disclosure, the sealing rib may be configured as a separate component from the casing, and may be mounted and fixed on the internal circumferential surface of the casing.

Furthermore, the casing may include a first casing portion and a second casing portion configured to be coupled to the first casing portion, wherein at least one of the first casing portion or the second casing portion includes the mass.

Furthermore, the sealing rib may be selectively provided on the internal circumferential surface of the casing portion including the mass, among the first casing portion and the second casing portion, wherein, when a plurality of fixing jig insertion holes are formed in the internal circumferential surface of the casing portion including the mass to be spaced from one another, the sealing rib simultaneously surrounds the fixing jig insertion holes in a closed loop form.

In another exemplary embodiment of the present disclosure, the mass may be formed of a zinc material and the casing may be made of a plastic material.

The casing may further include a thermal deformation space configured to expose at least a portion of the mass on the outside thereof.

Other aspects and embodiments of the present disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described with reference to the appended drawings. The accompanying drawings are provided only for better understanding of the exemplary embodiments of the present disclosure, and configurations and features shown in the drawings may be different from those actually implemented.

It will be further understood that the term "comprises", when used in the exemplary embodiment, specifies the presence of elements, but does not preclude the presence or addition of one or more other elements, unless specified otherwise.

It will be understood that, although the terms "first", "second", etc. may be used herein to describe various elements, the terms are used only to distinguish one element from another, and the order of these elements should not be construed as being limited by these terms.

Various embodiments of the present disclosure relates to a mass damper which is mounted on a refrigerant pipe for the flow of refrigerant in a vehicle air conditioner system to reduce vibration and noise generated in the refrigerant pipe, wherein the mass damper is configured to prevent the external circumferential surface of a casing from cracking due to thermal deformation and to prevent moisture and foreign substances from entering the casing, reducing costs compared to a conventional mass damper.

Figure 1:
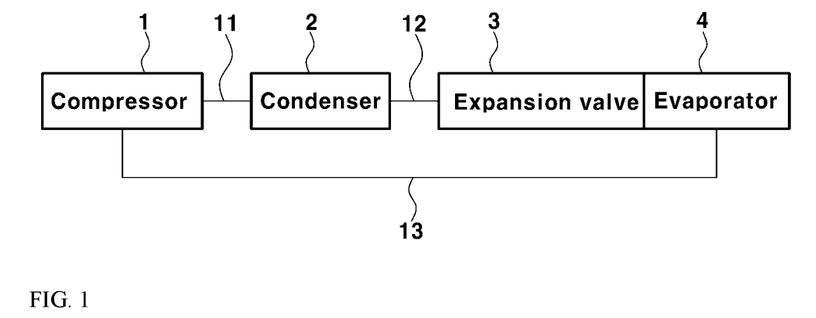
FIG. 1 is a schematic view exemplarily illustrating the configuration of an air conditioner system to which a mass damper according to an exemplary embodiment of the present disclosure is applied.
Figure 2:
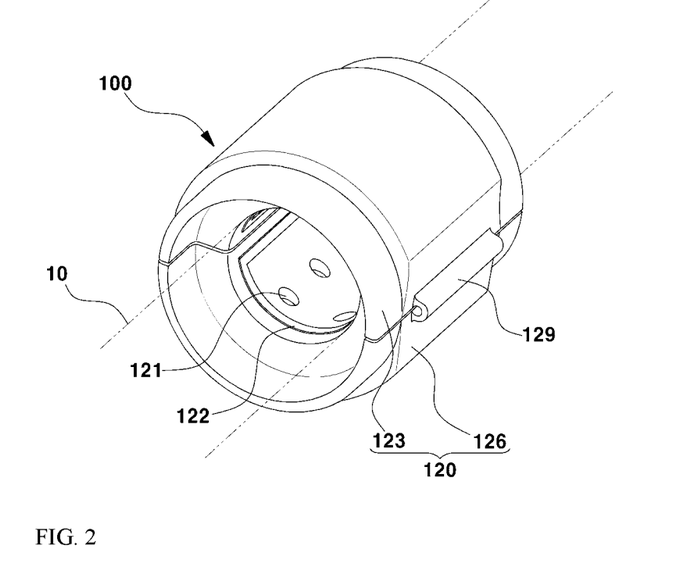
FIG. 2 is an oblique view taken from outside the mass damper according to various exemplary embodiments of the present disclosure.
Figure 3:
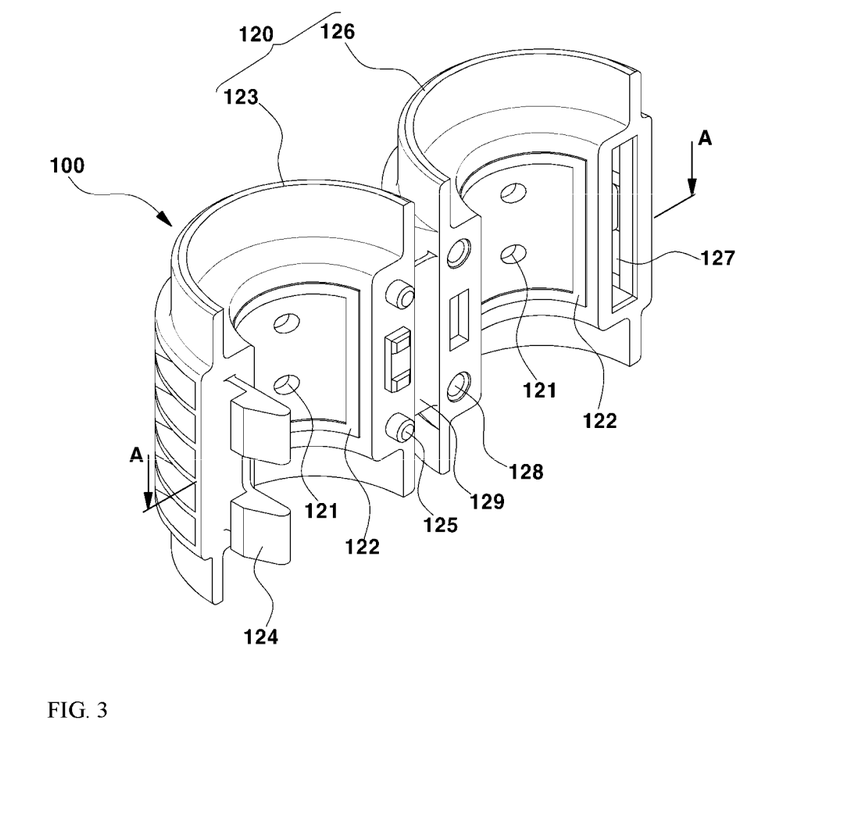
FIG. 3 is an exploded view of the mass damper according to various exemplary embodiments of the present disclosure.
Figure 4:
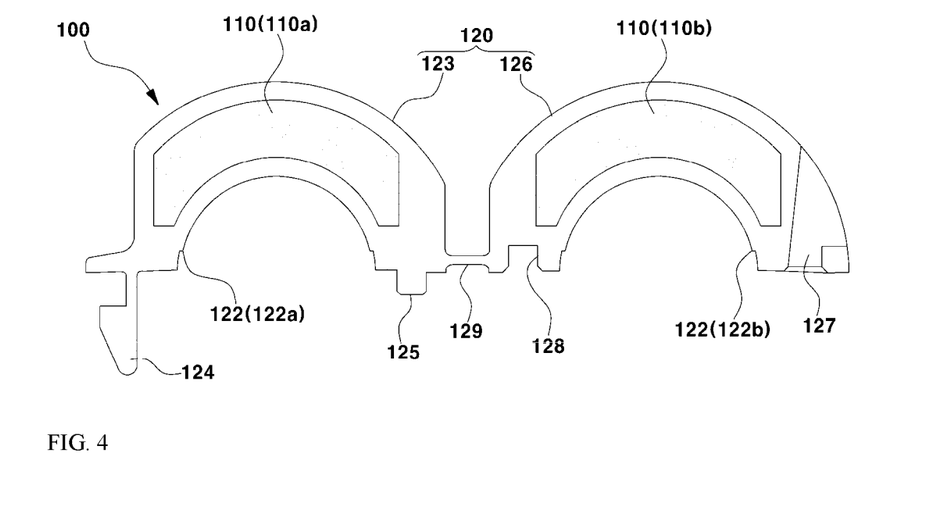
FIG. 4 is a cross-sectional view taken along line A-A of FIG. 3.
Figure 5:
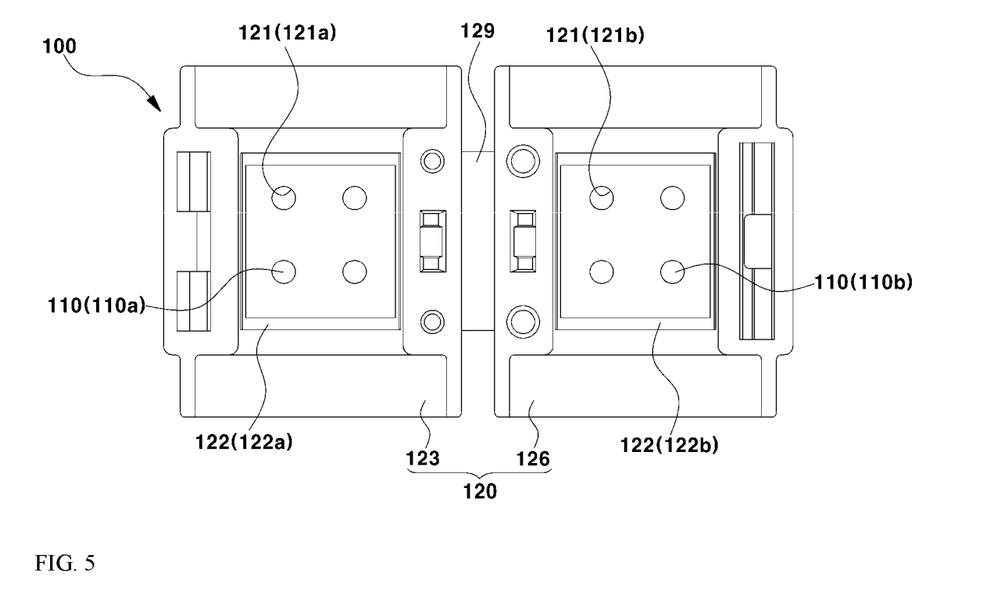
FIG. 5 is a view taken from the internal circumferential surface of a casing of the mass damper of FIG. 3.
Figure 6:
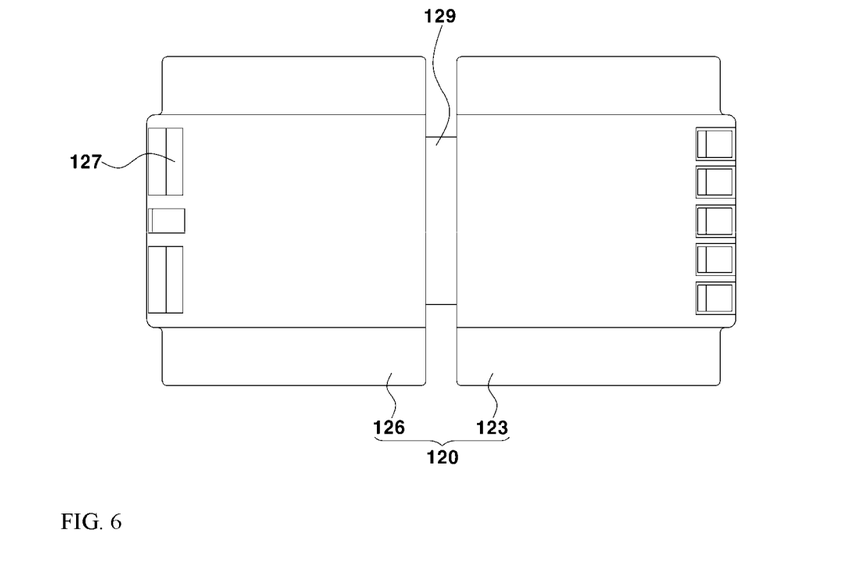
FIG. 6 is a view taken from the external circumferential surface of the casing of the mass damper of FIG. 3.
Figure 7:
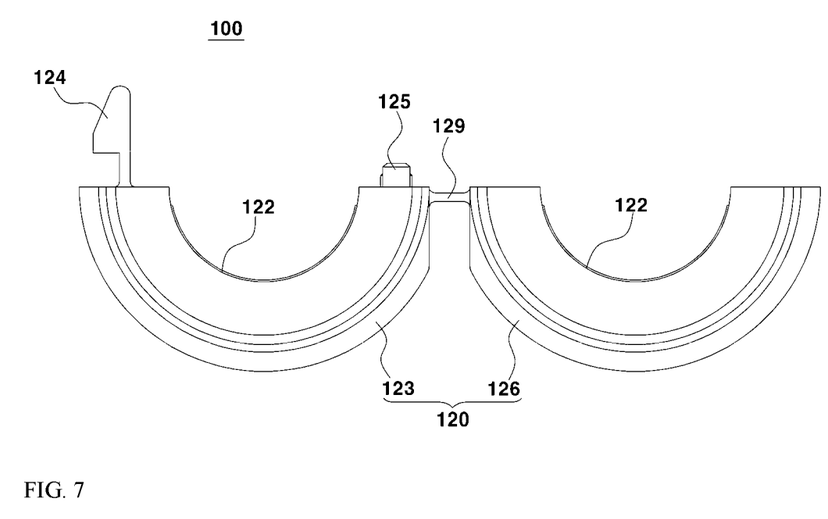
FIG. 7 is a view taken from the bottom surface of the mass damper according to various exemplary embodiments of the present disclosure.
Figure 8:
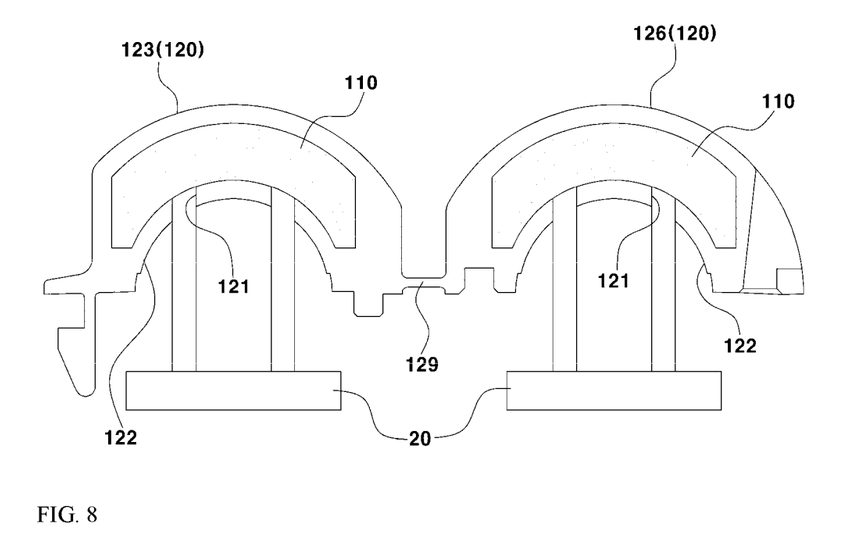
FIG. 8 is a view exemplarily illustrating a fixing jig configured to support a mass when injection molding the casing of the mass damper according to various exemplary embodiments of the present disclosure.
Figure 9:
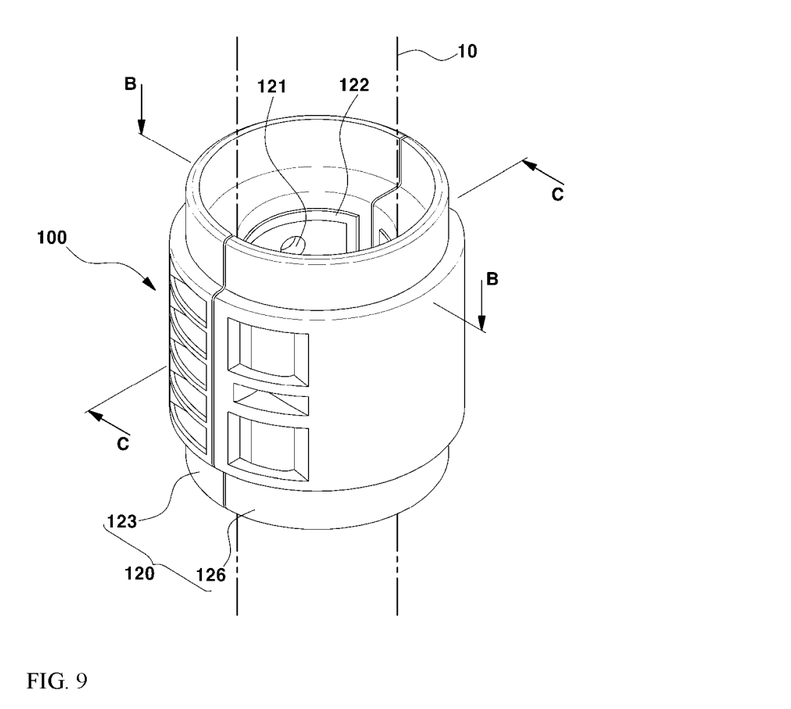
FIG. 9 illustrates the state in which the mass damper according to various exemplary embodiments of the present disclosure is assembled with a refrigerant pipe.
Figure 10:
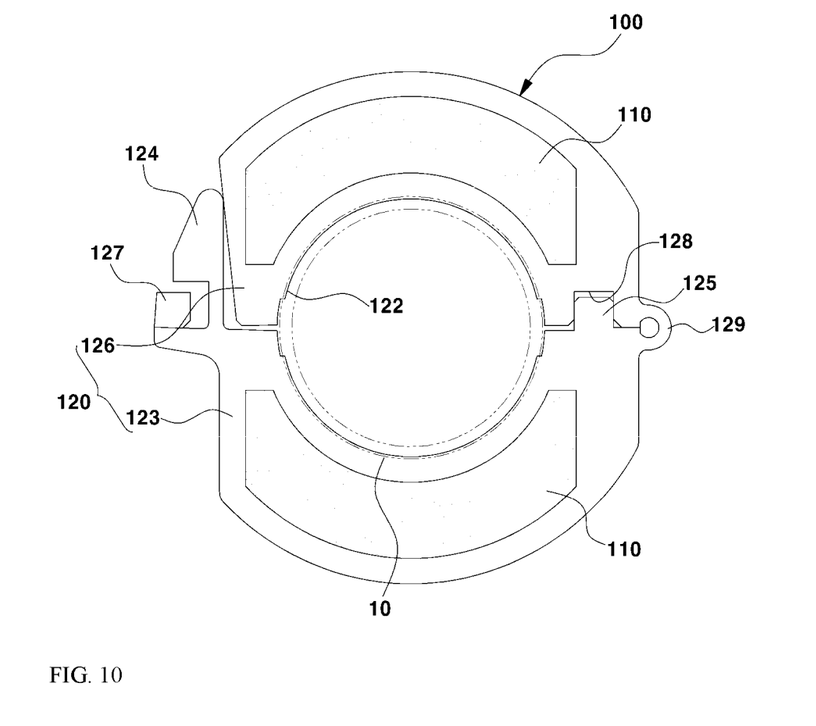
FIG. 10 is a view taken along line B-B of FIG. 9.
Figure 11:
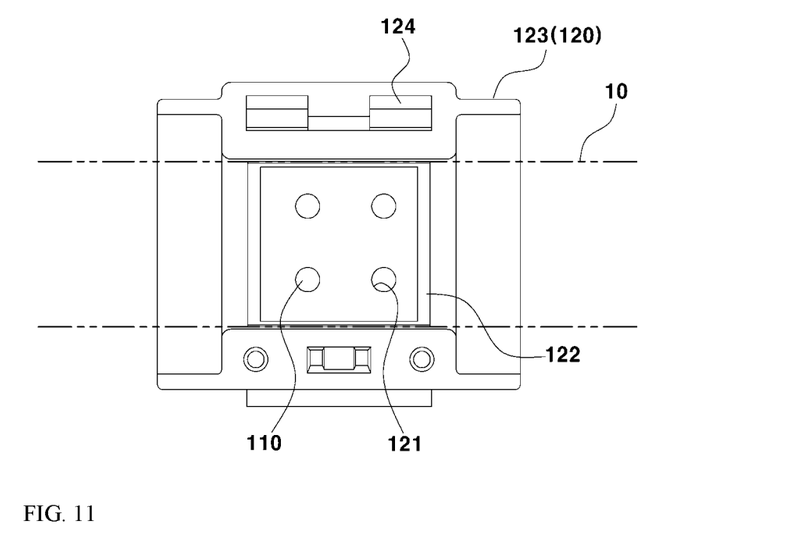
FIG. 11 is a view taken along line C-C of FIG. 9.
Figure 12:
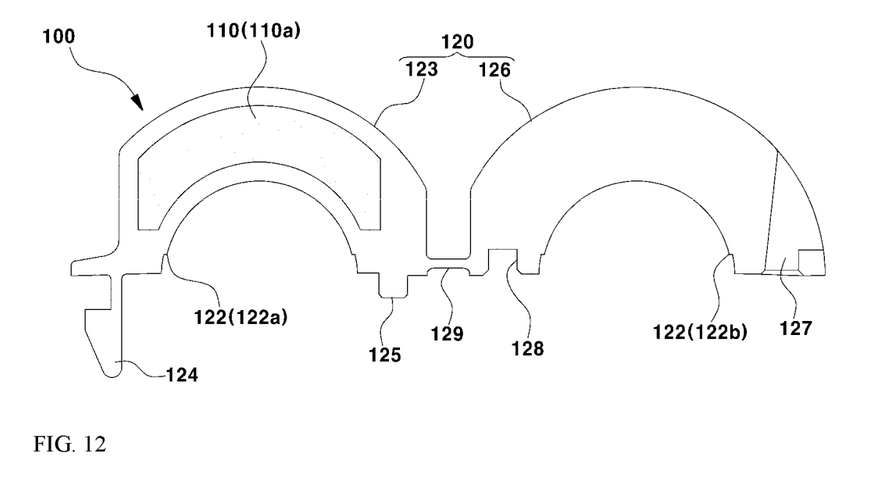
FIG. 12 is a cross-sectional view exemplarily illustrating a mass damper according to various exemplary embodiments of the present disclosure.
Figure 13:
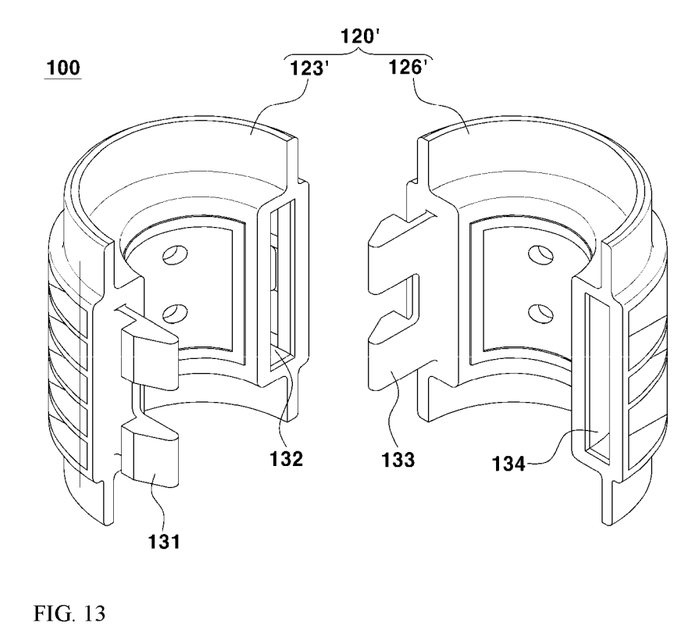
FIG. 13 is an exploded view of a mass damper according to various exemplary embodiments of the present disclosure.
Figure 14:
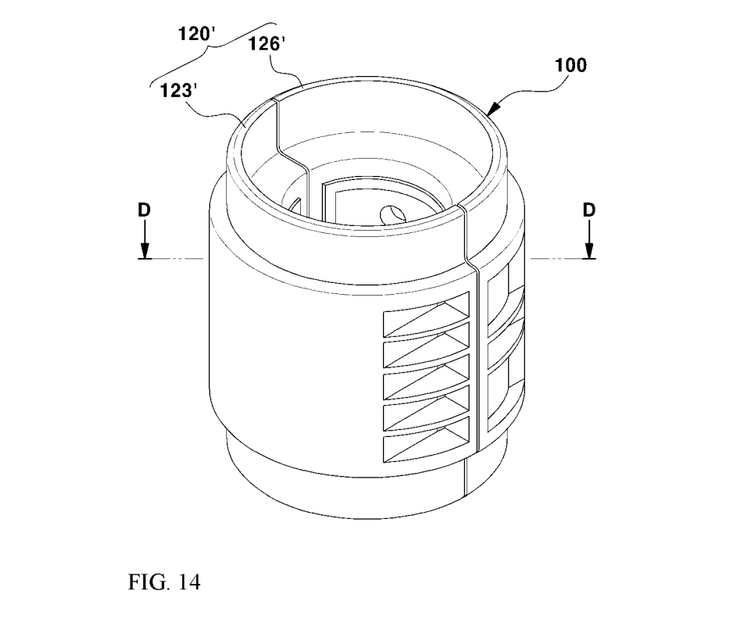
FIG. 14 is an assembled view of the mass damper according to various exemplary embodiments of the present disclosure.
Figure 15:
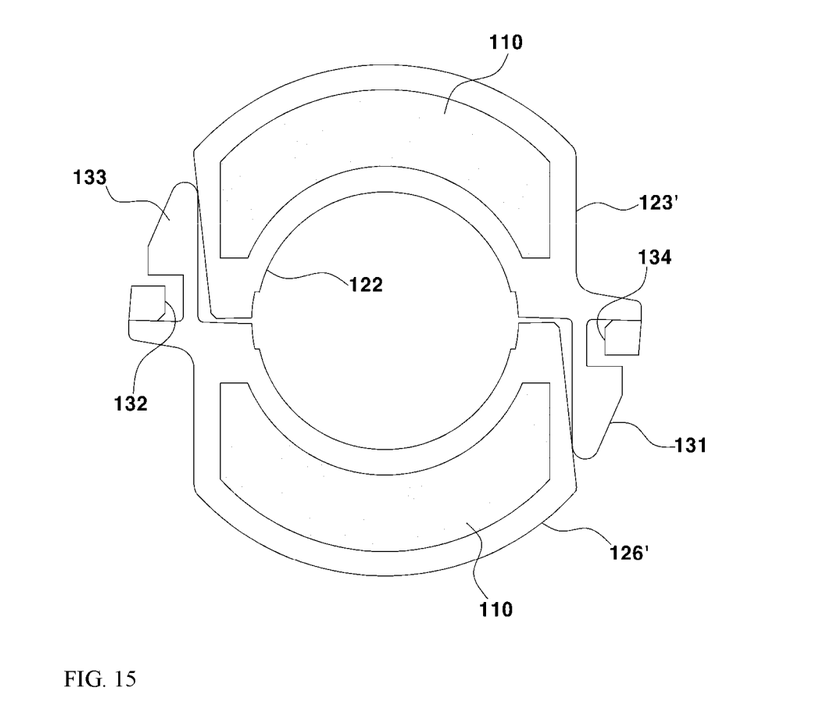
FIG. 15 is a view taken along line D-D of FIG. 14.

FIG. 1 is a schematic view exemplarily illustrating the configuration of an air conditioner system to which a mass damper according to an exemplary embodiment of the present disclosure is applied. FIG. 2 is an oblique view taken from outside the mass damper according to various exemplary embodiments of the present disclosure. FIG. 3 is an exploded view of the mass damper according to various exemplary embodiments of the present disclosure. FIG. 4 is a cross-sectional view taken along line A-A of FIG. 3. FIG. 5 is a view taken from the internal circumferential surface of a casing of the mass damper of FIG. 3. FIG. 6 is a view taken from the external circumferential surface of a casing of the mass damper of FIG. 3. FIG. 7 is a view taken from the bottom surface of the mass damper according to various exemplary embodiments of the present disclosure. FIG. 8 is a view exemplarily illustrating a fixing jig configured to support a mass when injection molding the casing of the mass damper according to various exemplary embodiments of the present disclosure. FIG. 9 illustrates the state in which the mass damper according to various exemplary embodiments of the present disclosure is assembled with a refrigerant pipe. FIG. 10 is a view taken along line B-B of FIG. 9. FIG. 11 is a view taken along line C-C of FIG. 9. FIG. 12 is a cross-sectional view exemplarily illustrating a mass damper according to various exemplary embodiments of the present disclosure. FIG. 13 is an exploded view of a mass damper according to various exemplary embodiments of the present disclosure. FIG. 14 is a mounted view of the mass damper according to various exemplary embodiments of the present disclosure. FIG. 15 is a view taken along line D-D of FIG. 14.

As shown in FIG. 1, an air conditioner system for vehicles includes a compressor 1, a condenser 2, an expansion valve 3, and an evaporator 4. The compressor 1 and the condenser 2 are connected to each other to enable the flow of a refrigerant through a discharge pipe 11, the condenser 2 and the expansion valve 3 are connected to each other to enable the flow of a refrigerant through a liquid pipe 12, and the evaporator 4 and the compressor 1 are connected to each other to enable the flow of a refrigerant through a suction pipe 13.

The discharge pipe 11, the liquid pipe 12, and the suction pipe 13 are refrigerant pipes for flow of refrigerant in the air conditioner system, and the mass damper of the present disclosure may be mounted at a predetermined position on the refrigerant pipe.

As shown in FIG. 2, FIG. 3 and FIG. 4, the mass damper 100 in an exemplary embodiment of the present disclosure includes a mass 110 and a casing 120.

The mass 110 has a predetermined weight to reduce vibration of the refrigerant pipe 10, and the mass 110 is formed of a metal material having a relatively high density. For example, the mass 110 is formed of a steel material.

The weight and number of the mass 110 may be changed to tune the vibration reduction performance of the mass damper 100.

As shown in FIGS. 3 to 7, the casing 120 is injection-molded outside the mass 110 to completely surround the mass 110. The casing 120 is made of a plastic material having relatively high elasticity.

The casing 120 is formed in a shape of cylinder configured for being mounted on the external circumferential surface of the refrigerant pipe 10, and the casing 120 is mounted and provided at a predetermined position on the refrigerant pipe 10 while surrounding the external circumferential surface of the refrigerant pipe 10.

When the casing 120 is mounted on the refrigerant pipe 10, the internal circumferential surface of the casing 120 faces the external circumferential surface of the refrigerant pipe 10. A plurality of fixing jig insertion holes 121 are provided in the internal circumferential surface of the casing 120.

A fixing jig 20 is used to fix the mass 110 at a predetermined position in a mold when the casing 120 is injection-molded. Referring to FIG. 8, the fixing jig insertion holes 121 are formed in the casing 120 by injection-molding the casing 120 at the outside of the mass 110 supported by the fixing jig 20.

The fixing jig insertion holes 121 are formed to extend from the internal circumferential surface of the casing 120 toward the external circumferential surface of the casing 120, and the fixing jig insertion holes 121 expose a portion of the mass 110, which is completely surrounded by the casing 120, to the outside of the casing 120. The mass 110, excluding the portion exposed through the fixing jig insertion holes 121, is not externally exposed of the casing 120.

The fixing jig insertion holes 121 may extend in a straight line along the shape of the fixing jig 20, and the mass 110 may be externally exposed of the casing 120 through the fixing jig insertion holes 121.

The fixing jig insertion holes 121 provide a space for deformation of the casing 120 when the mass 110 and the casing 120 are thermally deformed.

Furthermore, a sealing rib 122 is provided on the internal circumferential surface of the casing 120 to prevent moisture or foreign substances from entering the casing 120 through the fixing jig insertion hole 121.

As shown in FIG. 5, the sealing rib 122 is provided in a form of a closed loop on the outside of the fixing jig insertion holes 121 to completely surround the fixing jig insertion holes 121. The sealing rib 122 may be applied in a form of a loop including any one of various shapes, such as that of a square or an oval.

The sealing rib 122 may be integrally formed with the casing 120 during injection molding of the casing 120, and in the instant case, the sealing rib 122 may be formed to protrude inwards from the internal circumferential surface of the casing 120. Furthermore, the sealing rib 122 may be mounted on and fixed to the internal circumferential surface of the casing 120 as a separate component from the casing 120.

As shown in FIGS. 9 to 11, when the casing 120 is mounted on the external circumferential surface of the refrigerant pipe 10, that is, when the refrigerant pipe 10 is passed through the casing 120 to be provided inside the casing 120, the sealing rib 122 is in airtight contact with the external circumferential surface of the refrigerant pipe 10 while being compressed by the refrigerant pipe 10.

The sealing rib 122 seals the peripheral area of the fixing jig insertion holes 121 together with the refrigerant pipe 10 by airtightly contacting with the external circumferential surface of the refrigerant pipe 10. That is, the fixing jig insertion holes 121 are sealed by the sealing rib 122 and the refrigerant pipe 10.

The sealing rib 122 can prevent moisture or foreign substances from entering the casing 120 through the fixing jig insertion holes 121 by sealing the peripheral area of the fixing jig insertion holes 121, and as a result, the sealing rib 122 can prevent corrosion or deformation of the mass damper 100 due to the inflow of moisture or foreign substances.

Furthermore, as shown in FIG. 5, when a plurality of fixing jig insertion holes 121 is formed in the internal circumferential surface of the casing 120 to be spaced from one another, the sealing rib 122 may be configured to surround the external circumferences of the fixing jig insertion holes 121 in a form of a closed loop.

Although not shown in the drawings, when a plurality of fixing jig insertion holes 121 is formed in the internal circumferential surface of the casing 120, the sealing rib 122 may be provided on the outside of each fixing jig insertion hole 121.

Meanwhile, as shown in FIG. 2, FIG. 3, FIG. 4 and FIG. 5, the casing 120 has a first casing portion 123 and a second casing portion 126 to secure injection moldability and enable the casing 120 to be mounted on and assembled with the refrigerant pipe 10.

The first casing portion 123 and the second casing portion 126 may be integrally connected through a hinge 129, and the first casing portion 123 and the second casing portion 126 may be coupled to each other through a hook 124 and a receiving portion (to-be receiving portion) 127.

The first casing portion 123 and the second casing portion 126 may be configured to roughly divide the cylindrical casing 120 in half. That is, the first casing portion 123 and the second casing portion 126 may be formed in a semi-cylindrical shape.

The first casing portion 123 may be provided with the hook 124 and a fixing pin 125 on opposite sides thereof and the second casing portion 126 may be provided with the receiving portion 127 and a coupling hole on opposite sides thereof. The hook 124 is locked by being inserted into the receiving portion 127, and the fixing pin 125 is fixed by being press-fitted into the coupling hole 128.

The side of the first casing portion 123 and the side of the second casing portion 126 contact or face each other when the first casing portion 123 and the second casing portion 126 are coupled to each other, and contact or face each other when the hook 124 is fastened to the receiving portion 127 and the fixing pin 125 is fastened into the coupling hole 128. When the first casing portion 123 and the second casing portion 126 are coupled, the hinge 129 is bent in an arc shape or folded in half.

In an exemplary embodiment of the present invention, the first casing portion 123 may be provided with the hook 124 and a coupling hole on opposite sides thereof and the second casing portion 126 may be provided with the receiving portion 127 and a fixing pin 125 on opposite sides thereof.

When the casing 120 is molded using a plastic composite material including glass fibers or the like, the hinge 129 may be damaged due to repeated folding or the like.

In another exemplary embodiment of the present invention, when the hinge 129 is removed, a casing 120' may include a first casing portion 123' including a first hook 131 and a first receiving portion 132, and a second casing portion 126' including a second hook 133 and a second receiving portion 134, as shown in FIG. 13.

The first casing portion 123' may be provided with the first hook 131 and the first receiving portion 132 on opposite sides thereof, and the second casing portion 126' may be provided with a hook 133 and a second receiving portion 134 on opposite sides thereof.

Referring to FIG. 14, and FIG. 15, when the first casing portion 123' and the second casing portion 126' are coupled, the first hook 131 is locked by being inserted into the second receiving portion 134, and the second first hook 133 is locked by being inserted into the first receiving portion 132.

As shown in FIGS. 4 and 12, the mass 110 provided inside the casing 120 may be provided inside only one of the first casing portion 123 or the second casing portion 126, or may be provided inside each of the first casing portion 123 and the second casing portion 126. In other words, at least one of the first casing portion 123 or the second casing portion 126 includes the mass 110.

Here, the mass 110 provided inside the first casing portion 123 may be referred to as a first mass 110a, and the mass 110 provided inside the second casing portion 126 may be referred to as a second mass 110b (see FIG. 4).

Furthermore, the fixing jig insertion holes 121 and the sealing rib 122 may be selectively provided on the internal circumferential surface of the casing portion including the mass 110, among the first casing portion 123 and the second casing portion 126.

Referring to FIG. 5, the fixing jig insertion holes 121 formed in the internal circumferential surface of the first casing portion 123 may be referred to as a first fixing jig insertion holes 121a, and the fixing jig insertion holes 121 formed in the internal circumferential surface of the second casing portion 126 may be referred to as a second fixing jig insertion holes 121b. Furthermore, the sealing rib 122 formed on the internal circumferential surface of the first casing portion 123 may be referred to as a first sealing rib 122a, and the sealing rib 122 formed on the internal circumferential surface of the second casing portion 126 may be referred to as a second sealing rib 122b.

Furthermore, as shown in FIG. 12, when the mass 110 is provided only in the first casing portion 123, the second sealing rib 122b may also be provided in the casing portion 126 to facilitate contact of the first sealing rib 122a with the refrigerant pipe 10.

Furthermore, as shown in FIG. 4 and FIG. 5, when a plurality of fixing jig insertion holes 121 is formed in the internal circumferential surface of the casing portion provided with the mass 110, among the first casing portion 123 and the second casing portion 126, to be spaced from one another, the sealing rib 122 may be configured to simultaneously surround the external circumferences of the fixing jig insertion holes 121 in a form of a closed loop.

When the mass 110 is provided in each of the first casing portion 123 and the second casing portion 126, as shown in FIG. 4, one first sealing rib 122a simultaneously surrounds the external circumferences of a plurality of first fixing jig insertion holes 121a formed in the internal circumferential surface of the first casing portion 123, and one second sealing rib 122b simultaneously surrounds the external circumferences of a plurality of second fixing jig insertion holes 121b formed in the internal circumferential surface of the second casing portion 126.

In the mass damper 100 of the present disclosure, the shape and number of the mass 110 may be controlled to tune the vibration reduction performance thereof. For example, when one mass 110 is used, the mass 110 may be provided only in one of the first casing portion 123 and the second casing portion 126 (see FIG. 12), and when two masses 110 are used, one may be provided in the first casing portion 123 and the other may be provided in the second casing portion 126 (see FIG. 4).

Furthermore, the shape and size of the fixing jig insertion holes 121 in the mass damper 100 may be variously changed to secure a space for thermal deformation of the casing 120 upon an external temperature change.

The mass damper 100 in an exemplary embodiment of the present disclosure configured as described above has a structure in which the fixing jig insertion holes 121 exposing the mass 110 to the outside is provided in the internal circumferential surface of the casing 120, which comes into contact with the refrigerant pipe 10, sealing the space around the fixing jig insertion hole 121 when the casing 120 is provided on the outside of the refrigerant pipe 10, preventing the external circumferential surface of the casing 120 from cracking when the external temperature changes rapidly, and preventing moisture and foreign substances from entering the casing 120 through the cracks formed in the casing 120.

Also, the mass damper 100 has a structure in which the sealing rib 122 surrounds the outside of the fixing jig insertion holes 121, more effectively sealing the peripheral area of the fixing jig insertion holes 121 while bringing the sealing rib 122 into airtight contact with the external circumferential surface of the refrigerant pipe 10 when the casing 120 is mounted on the refrigerant pipe 10, effectively preventing the external circumferential surface of the casing 120 from cracking when the external temperature changes rapidly and effectively preventing moisture and foreign substances from entering the casing 120 through the cracks.

Furthermore, the mass damper 100 can prevent moisture and foreign substances from entering the casing 120 without using a conventional insoluble coating process or heat-shielding pad, thus reducing costs associated with the insoluble coating process or the heat-shielding pad.

Meanwhile, a mass damper according to various exemplary embodiments of the present disclosure will be described with reference to the accompanying FIGS. 16 to 20. In the instant case, some or all of the description of configurations that are the same as in the above-described embodiments may be omitted.

Figure 16:
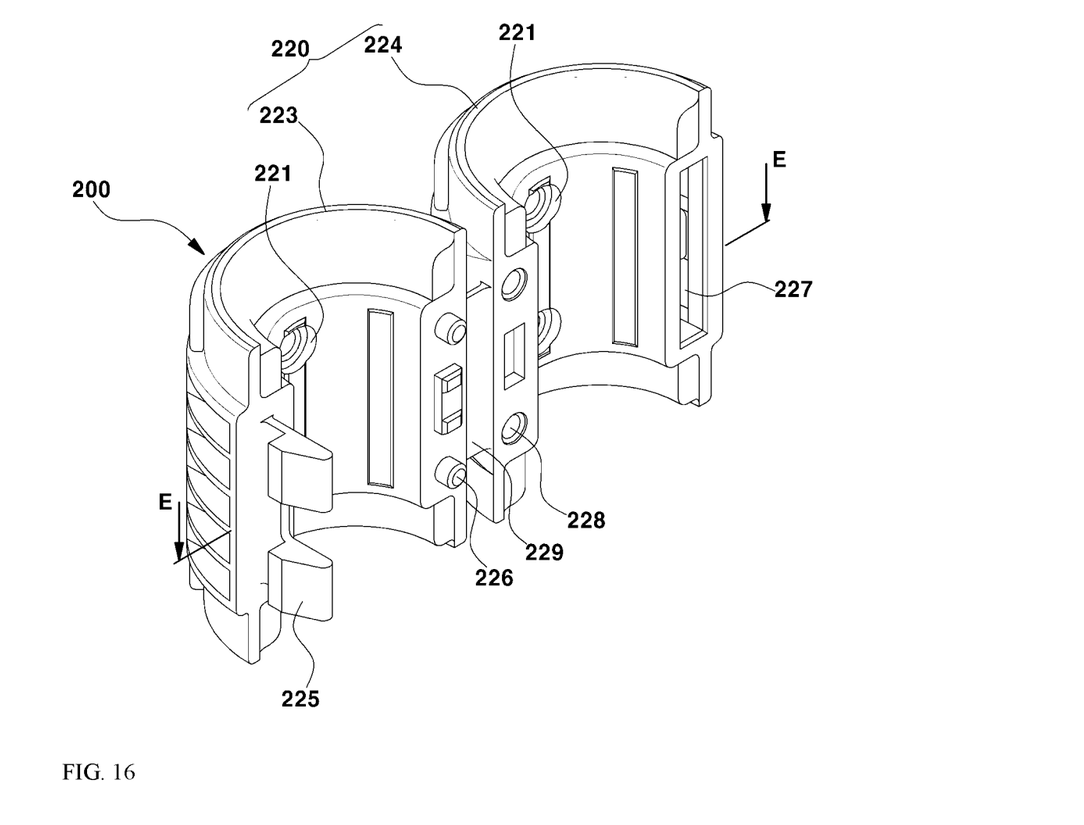
FIG. 16 is an exploded view of a mass damper according to various exemplary embodiments of the present disclosure.
Figure 17:
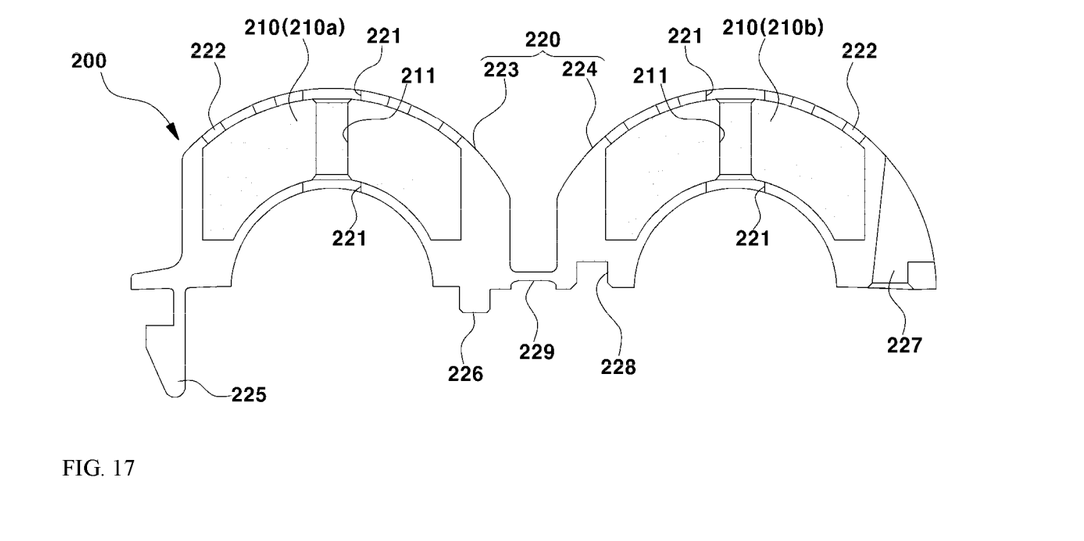
FIG. 17 is a cross-sectional view taken along line E-E of FIG. 16.
Figure 18:
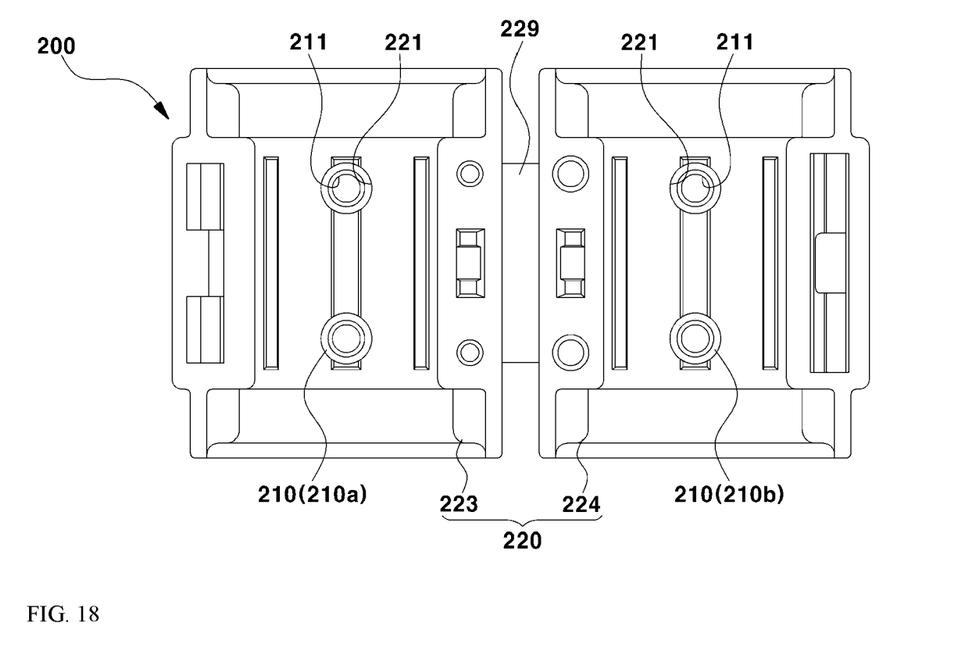
FIG. 18 is a view taken from the internal circumferential surface of a casing of the mass damper of FIG. 16.
Figure 19:
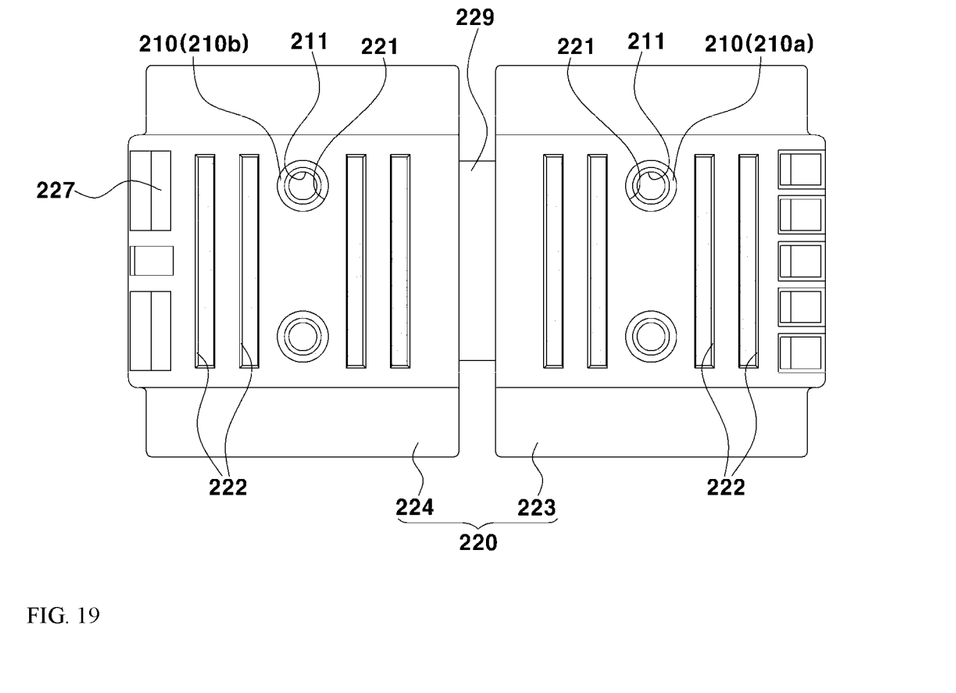
FIG. 19 is a view taken from the external circumferential surface of the casing of the mass damper of FIG. 16.
Figure 20:
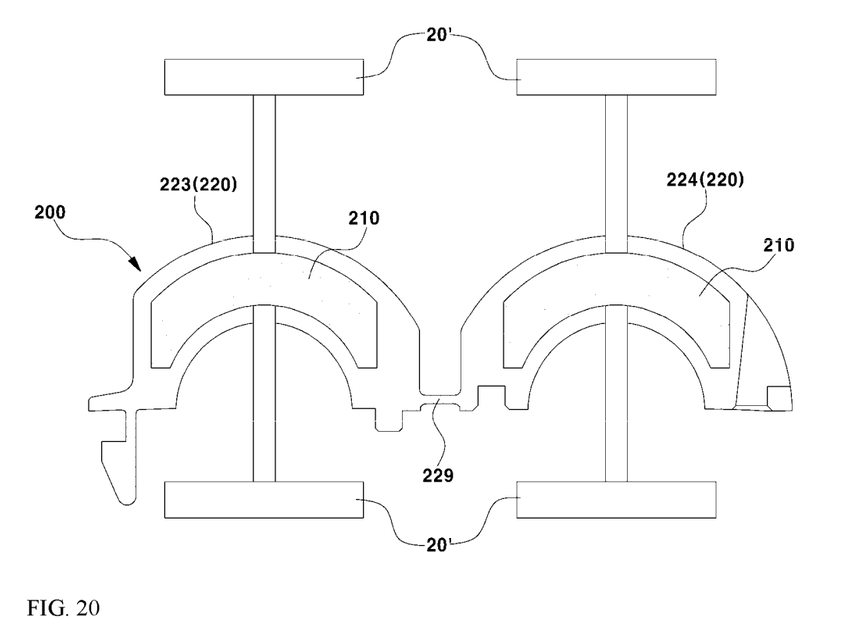
FIG. 20 illustrates a fixing jig configured to support a mass when injection-molding the casing of the mass damper according to various exemplary embodiments of the present disclosure.

FIG. 16 is an exploded view of a mass damper according to various exemplary embodiments of the present disclosure, FIG. 17 is a cross-sectional view taken along line E-E of FIG. 16, FIG. 18 is a view taken from the internal circumferential surface of a casing of the mass damper of FIG. 16, FIG. 19 is a view taken from the external circumferential surface of the casing of the mass damper of FIG. 16, and FIG. 20 illustrates a fixing jig configured to support a mass when injection-molding the casing of the mass damper according to various exemplary embodiments of the present disclosure.

As may be seen from FIGS. 16 to 19, the mass damper 200 according to various exemplary embodiments of the present disclosure includes a mass 210 and a casing 220.

The mass 210 is formed to have a predetermined mass to reduce vibration of the refrigerant pipe (refer to reference numeral "10" in FIGS. 9 to 11), and is made of a metal having a relatively high density. The mass 210 is made of a zinc (Zn) material.

Because the mass 210 is made of a zinc material, the surface thereof is oxidized in air to form an oxide film (i.e., a zinc oxide layer). The oxide film is densely formed on the surface of the mass 210 to a very small thickness (e.g., a thickness of nm) to prevent further corrosion and internal corrosion of the mass 210.

That is, the oxide film is generated on the surface of the mass 210, preventing corrosion of the inside of the mass 210. The oxide film is formed before the casing 220 is injection-molded on the surface of the mass 210.

The casing 220 is formed of a material having elasticity higher than that of the mass 210. The casing 220 is made of a plastic material.

The casing 220 is formed in a shape of cylinder which may be assembled on the external circumferential surface of the refrigerant pipe 10, and is mounted and provided at a predetermined position of the refrigerant pipe 10 to surround the external circumferential surface of the refrigerant pipe 10.

Referring to FIG. 20, a fixing jig 20' is used to fix the mass 210 at a predetermined position in the mold during injection molding of the casing 220. The fixing jig 20' may be configured to support and fix the internal and external peripheral surfaces of the mass 210 to stably fix the mass 210.

Since the casing 220 is molded on the outside of the mass 210, which is fixedly supported by the fixing jig 20' as described above, at least one fixing jig insertion hole 221 is formed in the internal and external portions of the casing 220. Here, the internal portion of the casing 220 includes the internal peripheral surface of the casing 220, and the external portion of the casing 220 includes the external peripheral surface of the casing 220.

The mass 210 is externally exposed of the casing 220 through the fixing jig insertion holes 221, but an oxide film is formed on the surface thereof, so deformation due to additional corrosion and corrosion caused by external moisture and foreign substances may be prevented.

That is, the casing 220 is injection-molded on the outside of the mass 210 on which the oxide film is formed, so further corrosion and deformation of the mass 210 due to the fixing jig insertion holes 221 may be prevented.

In other words, even if the mass 210 is externally exposed of the casing 220 through the fixing jig insertion holes 221, the oxide film generated on the surface of the mass 210 blocks further corrosion and internal corrosion of the mass 210, preventing deformation and deterioration of durability due to corrosion of the mass 210.

Furthermore, referring to FIG. 17, the mass 210 may be provided with a through hole 211 penetrated by the fixing jig 20' during injection molding of the casing 220. The through hole 211 may be provided on the same line as the fixing jig insertion hole 221. The through hole 211 may have a smaller diameter than the fixing jig insertion hole 221.

Furthermore, although the casing 220 is provided with a space for thermal deformation thereof by the fixing jig insertion holes 221, the position and size of the fixing jig insertion holes 221 are determined by the structure of the fixing jig 20' used for injection molding of the casing 220.

Accordingly, to separately secure thermal deformation space for the casing 220 other than that provided by the fixing jig insertion hole 221, the casing 220 may include at least one thermal deformation space 222 on the outside thereof. The thermal deformation space 222 may be formed in the external portion of the casing 220 to expose at least a portion of the mass 210 provided in the casing 220.

Furthermore, the casing 220 has a first casing portion 223 and a second casing portion 224 coupled to the first casing portion 223 to secure injection moldability and enable the casing 220 to be mounted on and assembled with the refrigerant pipe 10.

The first casing portion 223 and the second casing portion 224 may be provided with a hook 225, a fixing pin 226, a receiving portion (to-be receiving portion) 227 and a coupling hole 228 to couple the first casing portion 223 to the second casing portion 224. Also, the element designated by reference numeral 229 is a hinge 229 which is integrally formed with the first casing portion 223 and the second casing portion 224 to connect the first casing portion 223 to the second casing portion 224.

At least one of the first casing portion 223 and the second casing portion 224 includes a mass 210. Referring to FIG. 17, a first mass 210a and a second mass 210b are provided inside the first casing portion 223 and the second casing portion 224, respectively.

According to the exemplary embodiments of the present disclosure described above, the mass damper of various aspects of the present disclosure are directed to providing the following effects.

First, the mass damper has a structure in which the fixing jig insertion hole exposing the mass to the outside is provided in the internal circumferential surface of the casing, which comes into contact with the refrigerant pipe, sealing the space around the fixing jig insertion hole when the casing is provided on the outside of the refrigerant pipe, preventing the external circumferential surface of the casing from cracking when the external temperature changes rapidly, and preventing moisture and foreign substances from entering the casing through the cracks.

Second, the mass damper has a structure in which the sealing rib surrounds the outside of the fixing jig insertion holes, more effectively sealing the peripheral area of the fixing jig insertion holes while bringing the sealing rib into airtight contact with the external circumferential surface of the refrigerant pipe when the casing is mounted on the refrigerant pipe, consequently more effectively preventing the external circumferential surface of the casing from cracking when the temperature changes rapidly and more effectively preventing moisture and foreign substances from entering the casing through the cracks.

Third, the mass damper can prevent moisture and foreign substances from entering the casing without using a conventional insoluble coating process or heat-shielding pad, reducing costs associated with the insoluble coating process or the heat-shielding pad.

Fourth, the mass is made of a zinc material, whereby an oxide film is formed on the entire surface of the mass. Accordingly, even when the mass is externally exposed through the fixing jig insertion hole, it is possible to prevent corrosion by moisture and foreign substances. Also, it is possible to prevent deformation of the casing due to corrosion of the mass.

Fifth, a thermal deformation space in the casing is formed separately from the fixing jig insertion hole, so additional space for accommodating thermal expansion of the casing may be obtained.

The effects of the present disclosure are not limited to those mentioned above. It may be understood that the effects of the present disclosure include all effects which may be inferred from the description of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A mass damper apparatus for a vehicle air conditioning system, mounted on a refrigerant pipe for flow of a refrigerant in the vehicle air conditioner system to reduce vibrations generated in the refrigerant pipe, the mass damper apparatus comprising:
    a mass having a predetermined weight;
    a casing injection-molded outside the mass and mounted to surround the refrigerant pipe at a predetermined position of the refrigerant pipe; and
    a plurality of fixing jig insertion holes formed in an internal circumferential surface of the casing facing the refrigerant pipe to expose the mass to the outside of the casing therethrough.

2. The mass damper apparatus of claim 1, further including a sealing rib provided on the internal circumferential surface of the casing and provided in a shape of a closed loop to surround the plurality of fixing jig insertion holes in the closed loop.

3. The mass damper apparatus of claim 2, wherein the sealing rib is in airtight contact with an external circumferential surface of the refrigerant pipe when the casing is mounted on the refrigerant pipe.

4. The mass damper apparatus of claim 3, wherein the sealing rib seals the plurality of fixing jig insertion holes together with the refrigerant pipe when the casing is mounted on the refrigerant pipe.

5. The mass damper apparatus of claim 2, wherein the sealing rib protrudes inwards from the internal circumferential surface of the casing.

6. The mass damper apparatus of claim 2, wherein the sealing rib is configured as a separate component from the casing, and is mounted and fixed on the internal circumferential surface of the casing.

7. The mass damper apparatus of claim 1, wherein the casing includes a first casing portion and a second casing portion configured to be coupled to the first casing portion, wherein at least one of the first casing portion or the second casing portion includes the mass.

8. The mass damper apparatus of claim 7,
    wherein the first casing portion and the second casing portion are hingedly coupled to each other.

9. The mass damper apparatus of claim 8,
    wherein one of the first casing portion and the second casing portion includes a hook and another of the first casing portion and the second casing portion includes a receiving portion into which the hook is configured to be coupled.

10. The mass damper apparatus of claim 9,
    wherein one of the first casing portion and the second casing portion includes a fixing pin and another of the first casing portion and the second casing portion includes a coupling hole, and
    wherein the fixing pin is configured to be fixed into the coupling hole.

11. The mass damper apparatus of claim 7,
    wherein the first casing portion and the second casing portion are detachably coupled to each other.

12. The mass damper apparatus of claim 11,
    wherein a first end of the first casing portion incudes a first hook and a second end of the first casing portion incudes a first receiving portion, wherein a first end of the second casing portion incudes a second hook and a second end of the second casing portion incudes a second receiving portion, and wherein the first hook of the first casing portion is configured to be coupled to the second receiving portion of the second casing portion, and the second hook of the second casing portion is configured to be coupled to the first receiving portion of the first casing portion.

13. The mass damper apparatus of claim 7,
wherein the sealing rib is selectively provided on the internal circumferential surface in a casing portion including the mass among the first casing portion and the second casing portion,
wherein, when a plurality of fixing jig insertion holes are formed in the internal circumferential surface of the casing portion including the mass to be spaced from one another, the sealing rib is formed to surround the plurality of fixing jig insertion holes in a shape of a closed loop.

14. The mass damper apparatus of claim 1, wherein the mass is made of a steel material, and the casing is made of a plastic material.

15. The mass damper apparatus of claim 1, wherein the mass is made of a zinc material, and the casing is made of a plastic material.

16. The mass damper apparatus of claim 15, wherein the casing further includes a thermal deformation space configured to expose at least a portion of the mass on an outside of the casing therethrough.

17. The mass damper apparatus of claim 1,
wherein the casing further includes a plurality of additional fixing jig insertion holes formed in an external circumferential surface of the casing to expose the mass to the outside of the casing therethrough, and
wherein the mass includes a through hole through which the plurality of fixing jig insertion holes and the plurality of additional fixing jig insertion holes are connected each other.

18. A mass damper apparatus for a vehicle air conditioning system, mounted on a refrigerant pipe for flow of a refrigerant in the vehicle air conditioner system to reduce vibrations generated in the refrigerant pipe, the mass damper apparatus comprising:
a mass having a predetermined weight;
a casing injection-molded outside the mass and mounted to surround the refrigerant pipe at a predetermined position of the refrigerant pipe; and
at least a fixing jig insertion hole formed in an internal circumferential surface of the casing facing the refrigerant pipe to expose the mass to the outside of the casing through the fixing jig insertion hole,
wherein the mass is made of a zinc material, and the casing is made of a plastic material.

19. The mass damper apparatus of claim 18,
wherein the casing includes a first casing portion and a second casing portion configured to be coupled to the first casing portion, and
wherein at least one of the first casing portion or the second casing portion includes the mass.

20. The mass damper apparatus of claim 18, wherein the casing further includes a thermal deformation space configured to expose at least a portion of the mass on an outside of the casing therethrough.

* * * * *